INVENTOR
L. A. SCHEITLER
BY Harry L. Newman
ATTORNEY

United States Patent Office
3,488,449
Patented Jan. 6, 1970

3,488,449
CODE TRANSMITTER

Lawrence A. Scheitler, Rochester, Ill., assignor to American Telephone and Telegraph Company, New York, N.Y., a corporation of New York Filed June 29, 1966, Ser. No. 561,516
Int. Cl. H04m 1/26
U.S. Cl. 179—90 10 Claims

ABSTRACT OF THE DISCLOSURE

The invention includes a group of ten lever operated switches each of which is associated with a particular digit. When any one of the lever switches is actuated, it initiates the repetitive energization of a control relay, and each energization of the control relay serves to operate a stepping switch and to interrupt the telephone line. The contacts of the stepping switch are each connected in series with an individual one of the lever switches and when the stepping switch engages the contact thereof that is connected to the actuated lever switch, the energization of the control relay is halted, the control relay at this point having pulsed the telephone line a number of times equivalent to the digit associated with the actuated lever switch. When the lever switch is thereafter released, a release relay is energized that returns the stepping switch to its rest position.

Figure 1:
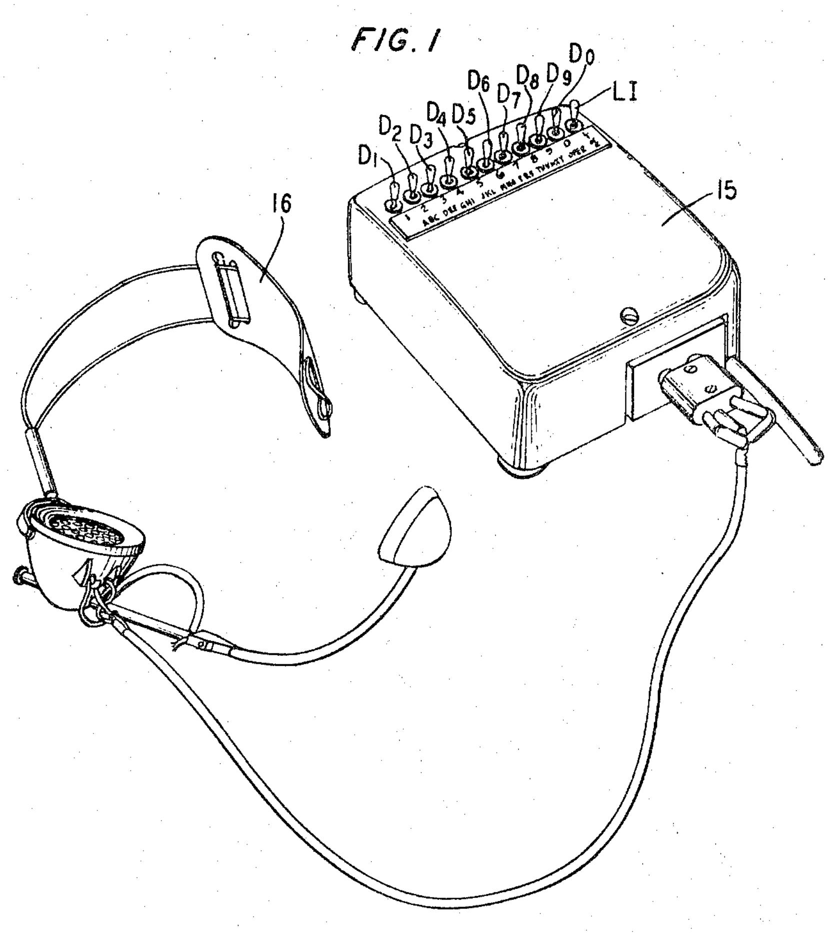

This invention relates to code transmitters and particularly to code transmitters employed to make telephone calls, such code transmitters being commonly referred to as call transmitters.

Since the introduction of automatic switching for the connection of one telephone subscriber to another, call transmitters have become a necessary part of the telephone communication system. Up until recently the conventional call transmitter has been the rotary dial. This call transmitter requires the user to have sufficient control of his muscles to insert either his finger or a finger-like object into a selected hole in the finger wheel and rotate the finger wheel in a clockwise direction until his finger or the finger-like object is arrested by the finger stop. In addition, it requires the user to have sufficient strength in his muscles to rotate the finger wheel in opposition to a spring acting to rotate the finger wheel in a counterclockwise direction.

With the development of electronic switching systems, a pushbutton call transmitter has been introduced. The pushbutton call transmitter requires less motion on the part of the user than the rotary dial, but still requires that the user have sufficient muscular control to push down a selected button. Furthermore, it requires the user to have sufficient strength in his muscles to push the button down in opposition to a spring acting to move the button up.

While nearly all telephone subscribers do the above operations without a moment's thought, there are some subscribers who have been the victims of strokes, polio, or comparable diseases to whom both of these operations are an impossible task. And to such subscribers, communication by means of the telephone often becomes a more significant part of their lives than for the subscriber having full use of his facilities.

A portion of these subscribers are completely incapacitated. Others, however, have the ability to move a finger to a selected location and then move the finger either forwardly or rearwardly provided little or no resistance is offered to this motion.

An object of this invention is to provide a new code transmitter.

A further object of this invention is to provide a call transmitter that can be operated by a subscriber falling within the last described category.

These and other objects of this invention are achieved in the illustrative embodiment thereof wherein the call transmitter comprises a group of ten lever operated switches each of which is associated with a particular digit. When any one of the digit switches is actuated it initiates the repetitive energization of a control relay, and each energization of the control relay serves to operate a stepping switch and to interrupt the telephone line. The contacts of the stepping switch are each connected in series with an individual one of the digit switches and when the stepping switch engages the contact thereof that is connected to the actuated digit switch the energization of the control relay is halted, the control relay at this point having pulsed the telephone line a number of times equivalent to the digit associated with the actuated digit switch. When the digit switch is thereafter released, a release relay is energized that returns the stepping switch to its rest position.

A complete understanding of the invention and of these and other features and advantages thereof may be gained from consideration of the following detailed description which in conjunction with the accompanying drawing discloses one embodiment of the invention. It is to be expressly understood, however, that the drawing and description are not to be construed as defining the limits of the invention.

Figure 2:
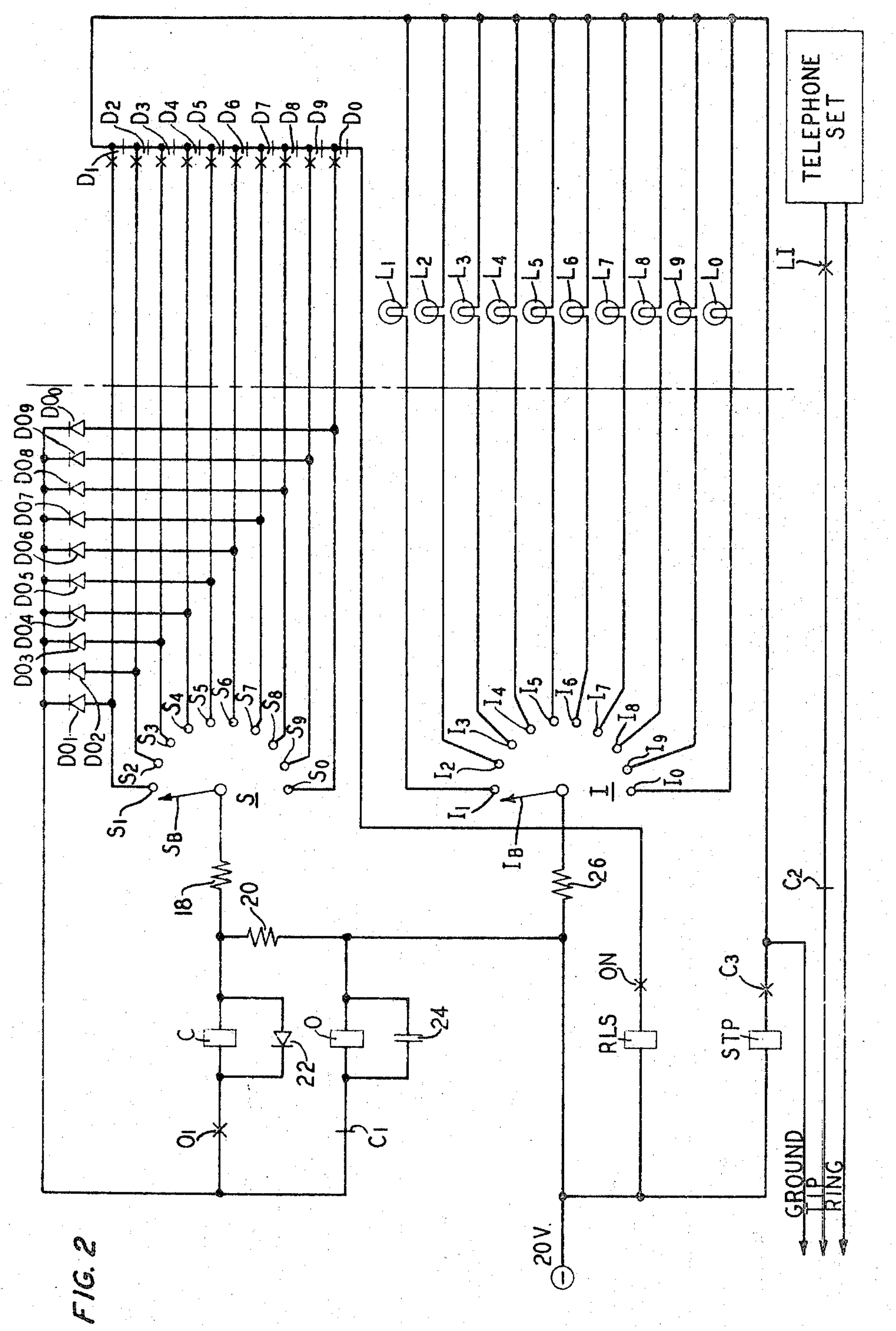

In the drawing:

FIG. 1 is a perspective view of a handicapped subscriber's telephone set embodying the call transmitter of the present invention; and FIG. 2 is a schematic circuit diagram of the call transmitter.

Referring to the drawing and FIG. 1 in particular, the call transmitter comprises eleven lever operated switches mounted within a housing 15, the housing having a headset 16 connected thereto. Ten of the switches, designated $D_1$ through $D_0$, respectively correspond to the digits one through zero while the eleventh switch, designated LI, serves to seize a telephone line in the same manner as when the handset is removed from the cradle of the conventional telephone set.

Advantageously, the lever operated digit switches are of the type sold by the Switchcraft Company under the designation Feather Lever. Such switches are actuated by moving the levers thereof in either a forward or a rearward direction and the spring loading is such that very little resistance is offered to the movement of the levers. In one specific embodiment a monostable switch No. 29203 was used for the digit switches $D_1$ through $D_0$ and a bistable switch No. 29306L was used for the line switch LI.

As shown in FIG. 2, each of the digit switches $D_1$ through $D_0$ includes a pair of normally closed contacts and a pair of normally open contacts, the actuation of any of the switches resulting in the opening of the normally closed contacts and the closing of the normally open contacts thereof. The digit switch $D_1$ is connected to ground while the normally closed contacts of the switches $D_1$ through $D_9$ connect each in series with the switch of the next succeeding digit. The normally closed contacts of the digit switch $D_0$, on the other hand, connect it in series with a normally open off normal switch ON, the off normal switch being connected through a release relay RLS to negative battery.

The normally open contacts of the digit switches $D_1$ through $D_0$ are respectively connected to contacts $S_1$ through $S_0$ of a stepping switch S. The stepping switch S includes a brush $S_B$ that is actuated responsive to the repetitive energization of a stepping relay STP to move from a rest position and engage each of the contacts $S_1$ through $S_0$ in sequence, each energization of the relay serving to advance the brush to the next succeeding contact. The brush $S_B$ is connected to negative battery through a pair of resistors 18 and 20 and thus it acts to connect negative battery to each of the contacts $S_1$ through $S_0$ and through them the normally open contacts of the digit switches $D_1$ through $D_0$ in sequence. Furthermore, the brush $S_B$ upon being advanced from the rest position closes the normally open off normal switch ON, and the brush is returned to the rest position responsive to the energization of the release relay RLS.

The normally open contacts of the digit switches $D_1$ through $D_0$ are also respectively connectable to negative battery through diodes $DO_1$ through $DO_0$ and two parallel paths in series with the diodes. One path comprises a pair of normally open contacts $O_1$ of an operate relay O, a control relay C, and the resistor 20 serially connected together, and the other path comprises a pair of normally closed contacts $C_1$ of the control relay connected in series with the operate relay.

Thus it is seen that when one of the digit switches is actuated whereby the normally open contacts thereof close, the operate relay O is energized and it closes the energization path of the control relay C. The energized control relay C, however, opens the energization path of the operate relay O, and when the operate relay is de-energized, it opens the energization path of the control relay. Finally, upon the de-energization of the control relay C, the energization path of the operate relay O is again closed and the aforegoing sequence is again initiated.

The operate relay O and the control relay C are therefore alternatively energized, and a diode 22 connected in parallel with the control relay and a capacitor 24 connected in parallel with the operate relay are selected to establish the frequency at which the relays are energized at ten times a second. In addition, these components are so selected that the contacts under the control of the control relay C are actuated sixty percent of the time and de-actuated forty percent of the time.

The control relay C operates two additional pairs of contacts. One pair of contacts $C_2$ are normally closed and are connected in series with the telephone line across which the telephone set associated with the call transmitter is connected. The normally open line switch LI is also connected in series with this line. The other pair of contacts $C_3$ are normally open and are connected in series with the stepping relay STP, the stepping relay and the contacts being connected between negative battery and ground.

An additional stepping switch I operates in conjunction with ten lamps $L_1$ through $L_0$ to provide a visible indication of when transmission of the selected digit is completed. The lamps $L_1$ through $L_0$ are respectively connected to ten contacts $I_1$ through $I_0$ of the stepping switch I and, in addition, the lamps are all connected to ground. A brush $I_B$ of the stepping switch is actuated by the stepping relay STP to move from a rest position and engage each of the contacts $I_1$ through $I_0$ in sequence. The brush $I_B$ is connected to negative battery through a resistor 26, and thus as the brush moves into engagement with a contact, the lamp in series therewith is illuminated. The brush $I_B$ is returned to the rest position responsive to the energization of the release relay RLS.

As an alternative, the conductors $I_1$ through $I_2$ may all be connected to a single lamp which will then be illuminated each time the brush $I_B$ of the stepping switch I engages one of the contacts. The user of the call transmitter is then informed that dialing of the selected digit is completed when the illumination of the single lamp becomes continuous rather than periodic.

In the operation of the call transmitter, the lever of the normally open line switch LI is actuated to close the line switch, and then the user listens for dial tone with the headset 16. Upon hearing dial tone, the user operates a lever associated with the first digit of the telephone number he wishes to call. Thus if the first digit is four, he operates the lever of the digit switch $D_4$, whereby the normally open contacts close and the normally closed contacts open.

A path is thereupon provided from ground through the closed normally open contacts of the digit switch $D_4$, the diode $DO_4$, the normally closed contacts $C_1$ of the control relay C, and the operate relay O to negative battery. The operated relay O is energized, and it closes the normally open contacts $C_1$ to energize the control relay C.

The energized control relay C opens the normally closed contacts $C_1$ to interrupt the energizing path of the operate relay O. The energized control relay C also opens the normally closed contacts $C_2$ to interrupt the telephone line and transmit a pulse thereover. Finally, it closes the normally open contacts $C_3$ to energize the stepping relay STP.

The energized stepping relay STP advances the brush $S_B$ of the stepping switch S to the first contact $S_1$ and advances the brush $I_B$ of the stepping switch I to the contact $I_1$. The movement of the brush $S_B$ from the rest position closes the normally open off normal switch ON and the movement of the brush $I_B$ into engagement with the contact $I_1$ connects the lamp $L_1$ between negative battery and ground whereby the lamp is illuminated.

The interruption of the energizing path of the operate relay O de-energizes the relay to open the normally open contacts $O_1$ in the energized path of the control relay C. The control relay C is thereby de-energized whereupon the open normally closed contacts $C_1$ close to re-establish the energizing path of the operate relay O; the open normally closed contacts $C_2$ close the telephone line; and the closed normally open contacts $C_3$ open to de-energize the stepping relay STP.

The foregoing sequence repeats itself until the stepping switch STP advances the brush $S_B$ of the stepping switch S to the contact $S_4$, this advancement occurring concurrently with the transmission of a fourth pulse out on the telephone line. When the brush $S_B$ engages the contact $S_4$, a path is provided from ground through the closed normally open contacts of the digit switch $D_4$, the contact $S_4$, the brush $S_B$, and the resistors 18 and 20 to negative battery. A short is thereby placed across the operate and control relays O and B, and the energization thereof is stopped.

At the same time the brush $I_B$ of the stepping switch I has advanced to the contact $I_4$ to illuminate the lamp $L_4$ and the user is thereby informed that the desired digit has been transmitted. The user then returns the lever of the digit switch $O_4$ to its normal position and with the closing of the normally closed contacts of the digit switch, a path is provided from ground through the normally closed contacts of all the digit switches $D_1$ through $D_0$, the closed normally open off normal switch ON and the release relay RLS to negative battery. The release relay RLS is energized and it returns the brushes $S_B$ and $I_B$ of the stepping switches S and I to their rest position, the return of the brush $S_B$ opening the off normal switch ON.

The user then operates the lever of the digit switch associated with the second digit of the selected telephone number and continues in this fashion until all the digits of the telephone number have been transmitted.

Although a specific embodiment of the invention has been shown and described, it will be understood that it is but illustrative and that various modifications may be made therein without departing from the scope and spirit of this invention as defined in the appended claims.

What is claimed is:

1. A code transmitter comprising:

a plurality of first switches;

a plurality of second switches, each second switch being connected to a first switch;

means responsive to the actuation of a first switch for actuating the second switches in sequence, the sequential actuating means stopping upon the actuation of a second switch connected to the actuated first switch; and means responsive to the actuation of the first switch for transmitting a signal concurrent with each actuation of a second switch.

2. A code transmitter as in claim 1 further including means responsive to the de-actuation of the first switch for returning the sequential actuating means to a rest position.

3. A code transmitter as in claim 1 wherein each first switch is selectively actuated by a lever associated therewith.

4. A code transmitter as in claim 1 wherein there is an equal number of first and second switches and each second switch is connected in series with an individual first switch.

5. A code transmitter as in claim 1 wherein the code transmitter is associated with a telephone line and the signal transmitting means comprises a first relay that is repetitively energized, the first relay interrupting the telephone line each time it is energized.

6. A code transmitter as in claim 5 wherein the sequential actuating means comprises a stepping relay that is repetitively energized responsive to the repetitive energization of the first relay.

7. A code transmitter as in claim 1 further including means for giving a visual indication as to when the sequential actuation of the second switches has stopped.

8. A call transmitter associated with a telephone line comprising:

a direct current source of power;

ten switches, each of which corresponds to an individual digit one through zero, each of which includes a pair of normally closed contacts and a pair of normally open contacts, and each of which when actuated closes the normally open contacts and opens the normally closed contacts thereof, the normally closed contacts of the digit switches one through nine connecting each switch in series with the switch of the next succeeding digit, the normally closed contacts of the digit switch zero connecting it to one side of the power source, and the digit switch one being connected to the other side of the power source;

a stepping switch having ten contacts corresponding to the digits one through zero, each contact being connected in series with the normally open contacts of the corresponding digit switch, the stepping switch being connected to the one side of the power source;

a stepping relay for operating the stepping switch to engage the contacts one through zero thereof in sequence, the stepping relay being connected across the power source;

a release relay for returning the stepping switch to a rest position wherein none of the contacts are engaged, the release relay being connected between the normally closed contacts of the zero digit switch and the one side of the power source and in series therewith;

a normally open off-normal switch connected between the normally closed contacts of the zero digit switch and the one side of the power source and in series therewith and with the release relay, the off-normal switch closing responsive to the displacement of the stepping switch from the rest position;

first and second relays connected in series with the normally open contacts of all the digit switches, the relays being connected in parallel with one another, the first relay having a pair of normally open contacts in series with the second relay and the second relay having a pair of normally closed contacts in series with the first relay, a pair of normally closed contacts in series with the telephone line and a pair of normally open contacts in series with the stepping relay, the first and second relays being connected to the one side of the power source in parallel with the stepping switch;

whereby when a digit switch is actuated, the first and second relays are alternatively energized to repetitively energize the stepping relay and interrupt the telephone line until the stepping switch engages the contact connected to the actuated digit switch whereupon the operation of the call transmitter stops, and when the actuated digit switch is de-actuated, the release relay is energized to return the stepping switch to its rest position.

9. A call transmitter as in claim 8 further including a second stepping switch operated by the stepping relay, the second stepping switch being connected to the one side of the power source, and a lamp connected between all the contacts of the stepping switch and the other side of the power source, the lamp providing a visible indication as to when the pulsing of the telephone line has stopped.

10. A call transmitter as in claim 8 further including a second stepping switch operated by the stepping relay, the second stepping switch being connected to the one side of the power source and an individual lamp connected between each of the contacts of the stepping switch and the other side of the power source, the lamp providing a visual indication as to when the pulsing of the telephone line has stopped and as to the particular digit that has been dialed.

References Cited

UNITED STATES PATENTS

| | | | |
|---|---|---|---|
| 3,171,114 | 2/1965 | Butler et al. | 340—379 |
| 3,366,747 | 1/1968 | Holzer | 179—90 |

KATHLEEN H. CLAFFY, Primary Examiner

B. P. SMITH, Assistant Examiner

U.S. Cl. X.R.

340—359, 365, 379